United States Patent Office 3,082,175
Patented Mar. 19, 1963

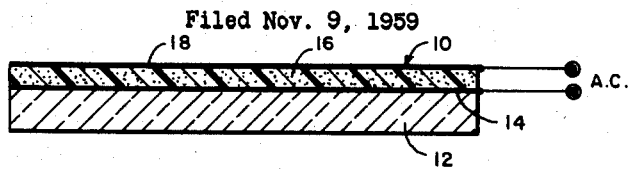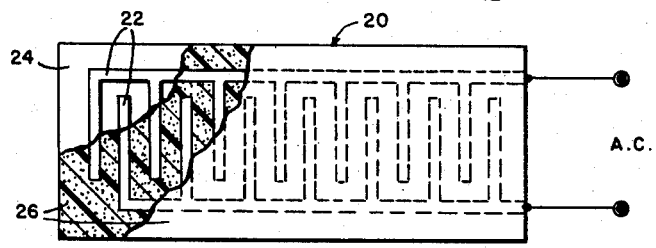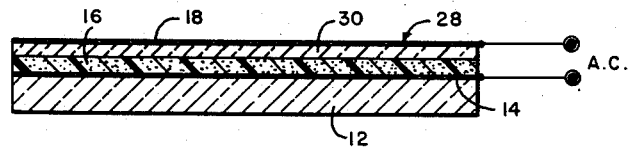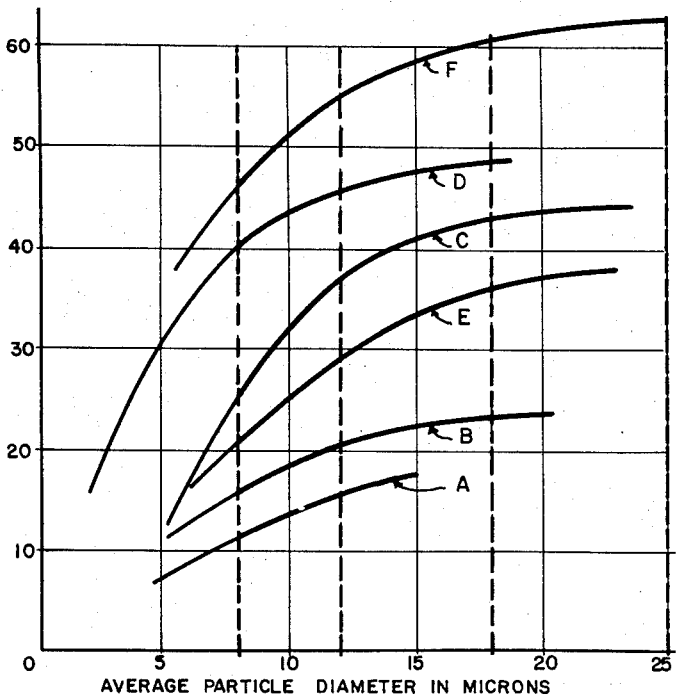

3,082,175
METHOD OF IMPROVING ELECTRO-
LUMINESCENT PHOSPHOR
William A. Thornton, Jr., Cranford, N.J., assignor to Westinghouse Electric Corporation, East Pittsburgh, Pa., a corporation of Pennsylvania
Filed Nov. 9, 1959, Ser. No. 851,663
4 Claims. (Cl. 252—301.6)

This invention relates to a method for improving electroluminescent phosphor and, more particularly, to a method for improving the maintenance of light emission of electroluminescent phosphor.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). Since this early publication, electroluminescent devices have been marketed commercially. Electroluminescent lamps normally display a reduction in light output as the lamps are operated. Various techniques have been suggested for improving the so-called maintenance of light output for electroluminescent lamps. One suggested technique is firing the electroluminescent phosphor in an air atmosphere at a reduced temperature and this is disclosed in copending application S.N. 782,829, filed December 24, 1958, and owned by the present assignee, now abandoned. Another suggested technique is encasing the lamp with a moisture-impervious layer to inhibit ingress of moisture and this is disclosed in S.N. 822,231, filed June 23, 1959, and owned by the present assignee. It is desirable to improve still more the maintenance of light output for electroluminescent lamps.

It is the general object of this invention to provide a method for improving the maintenance of light output for electroluminescent phosphor.

It is an additional object to provide details for a method for improving the maintenance of light output for electroluminescent phosphor.

The aforesaid objects of the invention, and other objects which will become apparent as the description proceeds, are achieved by providing a method for increasing the maintenance of electroluminescent light emission which is obtainable from finely-divided electroluminescent phosphors which have a particle size distribution extending over a considerable range. In accordance with this method, there is separated from the finely-divided electroluminescent phosphor substantially all phosphor particles which have a diameter less than 8 microns. Also, in order to preserve a high degree of utility for the phosphor for later incorporation into an electroluminescent lamp and to provide a better lamp, substantially all phosphor particles having a diameter greater than 25 microns are desirably removed.

For a better understanding of the invention, reference should be had to the accompanying drawings wherein:

FIG. 1 is a sectional elevational view of an electroluminescent lamp which incorporates electroluminescent phosphor of selected large particle size;

FIG. 2 is a plan view, partly broken away, of an electroluminescent lamp incorporating selected electroluminescent phosphor and wherein the electrodes are formed as an interlacing raster-type grid;

FIG. 3 is a sectional elevational view of an alternative lamp construction wherein the finely-divided phosphor is of a selected range of large particle sizes and wherein an additional layer is also included between the lamp electrodes;

FIG. 4 is a graph of percent initial brightness versus average particle diameter illustrating the improved maintenance of light output to be obtained from electroluminescent phosphors having a selected, relatively-large particle size.

With specific reference to the form of the invention illustrated in the drawings, in FIG. 1 is illustrated an electroluminescent lamp 10 which generally comprises a glass foundation 12 having carried thereon a first electrode 14 which is formed of tin oxide. Coated over the electrode 14 is a layer 16 comprising electroluminescent phosphor and coated over the layer 16 is a second electrode 18 which is formed of vacuum-metallized aluminum or copper iodide for example. An alternating electric potential is adapted to be applied across the electrodes 14 and 18 in order to energize the electroluminescent lamp.

The tin oxide electrode 14 can also be formed of other suitable light-transmitting, electrically-conducting material such as indium or titanium oxides or copper iodide for example. In this specific example the phosphor, which has been previously processed as explained hereinafter, is mixed with equal parts by weight of a light-transmitting dielectric such as polyvinyl-chloride acetate and the thickness of the layer 16 is approximately two mils. The thickness of the layer 16 is not critical and can be varied considerably. The relative proportions of phosphor and dielectric can also be varied. If desired, a separate layer of dielectric can be included between the cell electrodes 14 and 18 or the dielectric can be dispensed with entirely and powdered phosphor compacted between the two electrodes of the lamp without admixed dielectric. As an alternative embodiment, the plastic dielectric can be replaced by a glass dielectric and such constructions are well known.

The lamp embodiment 20 as shown in FIG. 2 is fabricated generally as disclosed in FIG. 3 of U.S. Patent No. 2,684,450, dated July 20, 1954. Briefly, this lamp embodiment comprises interlacing, raster-type electrodes 22 which are formed on an insulating foundation 24 and the processed phosphor per se or processed phosphor and mixed dielectric 26 is carried between the interlacing electrodes 22. An A.C. potential is adapted to be applied across the interlacing electrodes 22.

The lamp embodiment 28 as shown in FIG. 3 corresponds to the embodiment 10 as shown in FIG. 1 except that an additional layer 30 of high dielectric constant material such as barium titanate or titania is also included between the lamp electrodes 14 and 18. Such a construction enables the energizing potential applied across the lamp electrodes to be increased and because of the high dielectric constant of the layer 30, an increased electric field is applied across the phosphor to increase the brightness of the lamp. Such a construction is generally disclosed in British Patent No. 765,076, published January 2, 1957. All of the foregoing electroluminescent lamp constructions comprise spaced electrodes wherein particles of finely-divided electroluminescent phosphor of selected large particle size are included between the spaced electrodes.

Before processing in accordance with the present invention, electroluminescent phosphor is first prepared in conventional fashion. The best-known electroluminescent phosphors normally at least principally comprise zinc sulfide as matrix and the usual primary activator is copper. Other supplemental activators such as manganese and lead can also be used. Also, in order to enable the activator such as cuprous copper to be incorporated into the phosphor matrix, sufficient amounts of additional so-called coactivating materials having a valence which differs by two from the valence of the cuprous copper activator are also incorporated in the phosphor. As is well known, suitable coactivators for electroluminescent phosphors are chlorine, bromine, iodine, aluminum, scandium, gallium or indium, or any mixtures thereof. In addition, the zinc sulfide matrix component for the phosphor can be supplimented by additive matrix components such as cadmium or mercury or both and a part of the sulphur component of the matrix can be replaced by selenium. A zinc-carmium-mercuric sulfide electroluminescent phosphor is disclosed in S.N. 807,730, filed April 20, 1959, and owned by the present assignee, now abandoned, and a zinc sulfo-selenide electroluminescent phosphor is disclosed in U.S. Patent No. 2,847,386, dated August 12, 1958. Other electroluminescent phosphors are disclosed by Destriau and Ivey article titled "Electroluminescence and Related Topics," "Proceedings of the I.R.E.," volume 43, No. 12, pages 1911–1940 (December 1955).

Any electroluminescent phosphor such as indicated hereinbefore can be processed in accordance with the present invention in order to improve its maintenance of light emission. By way of further example, six zinc sulfide-type electroluminescent phosphors will be considered. These include: (A) a blue electroluminescent phosphor comprising zinc sulfide activated by copper and coactivated by chlorine, (B) a similar phosphor with increased activator and coactivator concentrations to produce a blue-green emission, (C) a similar phosphor with still-further increased activator and coactivator concentrations to produce a green emission, (D) a yellow-green emissive electroluminescent phosphor uitlizing still-greater concentrations of activator and coactivator, (E) a yellow emissive electroluminescent phosphor comprising zinc sulfide activated by copper and manganese and coactivated by low concentrations of chlorine and (F) a yellow emissive electroluminescent phosphor comprising zinc sulfide activated by copper and manganese and coactivated by relatively-high concentrations of chlorine. Such phosphors are generally well known and specific details for preparing the phosphors designated (A) through (C) and (E) are given in copending application S.N. 732,510, filed May 2, 1958, and owned by the present assignee, now Patent 2,972,692. The phosphor designated (D) is prepared by mixing 1,000 grams zinc sulfide with 30 grams sulphur 14 grams copper acetate, and 10 grams ammonium chloride. The mixture is fired at a temperature of 900° C. for approximately 110 minutes. Thereafter the phosphor desirably is lightly crushed and re-fired in a similar manner. The phosphor designated (F) is prepared by mixing 1,000 grams zinc sulfide with 20 grams sulphur, 9.5 grams copper acetate, 7 grams ammonium chloride and 40 grams manganese carbonate. The mixture is fired in a partially-closed container in a nitrogen atmosphere at a temperature of about 1100° C. for about two hours. For best output, the phosphor desirably is lightly crushed and refired in a similar manner. After preparation by firing, the fired phosphors designated (A) through (F) are gently crushed to finely-divided status and sieved through a 400-mesh screen, for example, to remove overly-large particles. For best performance the crushed phosphor is washed with a solvent for cuprous sulfide, such as sodium cyanide. Such a washing procedure is well known.

The brightness of the foregoing phosphors will vary considerably because of their different emission spectra and different activator and coactivator concentrations. As shown hereinafter, however, the effect of removing substantially all phosphor particles of less than a specified relatively-small size will improve the maintenance of electroluminescent light emission considerably, irrespective of the initial brightness and emission spectra for the different phosphors. On crushing and sieving after firing, the particle size distribution of the foregoing phosphors will extend over a considerable range. Many particles will have a diameter considerable less than 8 microns and many other particles have a diameter considerably greater than 8 microns and a curve of number of particles versus particle diameter will have a bell-shaped appearance. The smallest particles will normally have an average diameter in the order of 1 to 2 microns and the largest particles are those which will just pass the sieve. The average particle diameter for the foregoing phosphors designated (C) and (F) is approximately 14 to 16 microns and the average particle diameter for the other indicated phosphors is slightly smaller. Of course the average particle diameter for the crushed and sieved phosphor will vary greatly depending upon the phosphor composition and method of preparation as well as the crushing used in reducing the fired phosphor to finely-divided status.

In FIG. 4 are shown curves of percent of initial brightness versus average particle diameter for phosphors separated into different fractions of particle size. Each of the specific phosphor examples as given hereinbefore was separated into five individual fractions, using a water-settling technique, and the resulting curves are shown for each of the phosphors designated hereinbefore as (A) through (F). Each of the fractions as separated displayed a bell-shaped particle distribution curve. In taking the data supporting the curves of FIG. 4, the phosphor fractions were incorporated into similar test lamps which were operated at 4,000 cycles to accelerate any tendency for decay in light output. The percent maintenance after 24 hours of operation under such excitation was then measured. As shown in FIG. 4, the maintenance of light output drops off rapidly when the phosphor particles have an average diameter less than 8 microns. Thus in accordance with the present invention, in order to improve the maintenance of light output for electroluminescent phosphor, substantially all phosphor particles having a diameter of less than 8 microns are removed or deleted from the finely-divided, prepared phosphor. This is readily accomplished for any of the foregoing specific examples by suspending the otherwise-prepared, finely-divided phosphor in a fifty-centimeter-tall column of water. The suspended phosphor is allowed to settle for a period of about fifteen minutes. Thereafter the supernatant liquid and phosphor remaining suspended therein are decanted and the settled phosphor is again suspended in the column of water and allowed to settle for an additional fifteen minutes. In the usual case, two repetitions of the resuspension and settling of the phosphor will remove substantially all phosphor particles having a diameter less than 8 microns. Thereafter the settled phosphor is dried by heating to an elevated temperature as 100° C. and it is incorporated into an electroluminescent cell in accordance with conventional techniques. It should be understood that the foregoing phosphor settling as a means for removing substantially all particles having a diameter of less than 8 microns is subject to considerable variation. As an example, if a different suspending liquid medium is used, the prescribed settling time will vary. Likewise, if the height of the column of liquid in which the phosphor is suspended is varied, the prescribed phosphor settling time will vary. Alternative means such as an air-separation technique can be used to remove substantially all phosphor particles having a diameter less than 8 microns. Statistically expressing the curves shown in FIG. 4, the phosphor fractions having an average particle diameter of 10 microns displayed a percent maintenance of light output averaging about 1.7 times that of the particle fractions having an average diameter of 5 microns. The phosphor fractions having an average particle diameter of 15 microns displayed a percent maintenance of light output averaging about 2.1 times that of the 5 micron fractions. It is also noted that the present improvements in maintenance of light output are supplemental to other known methods and structures for improving this maintenance.

In order to facilitate fabrication of an electroluminescent lamp which incorporates phosphor processed in accordance with the present method, it is desirable to delete or remove from the phosphor substantially all phosphor particles having a diameter greater than 25 microns. In explanation, if a phosphor and mixed dielectric are applied to a tin-oxide-coated substrate by a spraying technique, overly-large particles having a diameter greater than 25 microns have a tendency to clog the spraying nozzles. Also, for operation on 110 volts, electroluminescent lamps are normally about one to two mils thick and it is desirable to remove such overly-large particles to avoid the possibility of overly-large particles shorting out the lamp electrodes. Removal of these large particles is readily accomplished by suspending in a fifty-centimeter-tall column of water that phosphor which has previously had substantially all particles having a diameter less than 8 microns removed therefrom. The suspended phosphor is settled for a period of approximately one second. Some of the finer particles are settled with the coarse particles during this initial settling and if it is desired to reclaim these settled fine particles, the phosphor settled in the one-second period can be resuspended and resettled. After this short settling period, the supernatant liquid with the phosphor remaining suspended therein is separated from the settled very coarse particles, filtered and the recovered phosphor dried as before. The resulting remaining, recovered phosphor will have removed therefrom substantially all phosphor particles having a diameter of less than 8 microns and greater than 25 microns. Such a phosphor will have an excellent maintenance of light output and is also readily adapted to be incorporated into an electroluminescent lamp by a spraying technique.

As shown in FIG. 4, the curve of percent of initial brightness versus average particle diameter generally levels off when the average particle diameter of the phosphor is about 15 microns. For facility of fabrication and performance in an electroluminescent lamp, the finer phosphor particles are desired. In order to achieve excellent maintenance of light output characteristics for the lamp which incorporates the present phosphor, while still utilizing phosphor particles which are as fine as possible commensurate with the improved maintenance objective, it is desirable that the phosphor particles which are incorporated into the lamp have an average diameter of approximately 15 microns. As a practical matter, it is extremely difficult to separate just those particles which have a diameter of approximately 15 microns and some distribution about this mean or average is necessary. It has been found that if the phosphor particles have a particle size distribution extending from 12 to 18 microns, the maintenance of light emission for the lamp incorporating such phosphor will be very good and the other performance characteristics of the lamp will also be good. A curve of number of particles versus average particle diameter taken for such a phosphor will have a bell-shaped appearance extending from about 12 microns on the low side to about 18 microns on the high side. Such a separation of the phosphor is readily accomplished for any of the specific examples designated (A) through (F) hereinbefore by first suspending the phosphor in a fifty-centimeter-tall column of water and settling the suspended phosphor for a period of about five minutes. This operation is repeated several times by resuspending the phosphor which settles during this five-minute settling. The collected phosphor which settles during this period is then resuspended in the fifty-centimeter column of water and settled for a period of approximately one minute. This one-minute settling is repeated several times. Thereafter the phosphor which remains suspended in the supernatant liquid during this one-minute settling period is separated, filtered from the supernatant liquid and dried. The resulting separated phosphor will have a particle size range extending from about 12 to about 18 microns, with the curve of distribution of the particles within this range having a bell-shaped appearance. Thereafter the separated, remaining phosphor is incorporated into an electroluminescent lamp in accordance with conventional practices.

It will be recognized that the objects of this invention have been achieved by providing a method and method details for improving the maintenance of light output for electroluminescent phosphor.

While best embodiments of the invention have been illustrated and described in detail, it is to be particularly understood that the invention is not limited thereto or thereby.

I claim:

1. The method of increasing the maintenance of electroluminescent light emission obtainable from finely-divided electroluminescent phosphor at least principally comprising zinc sulfide and having a particle size distribution extending from considerably less than 8 microns to considerably greater than 8 microns, while preserving a high degree of utility for the phosphor for incorporation into an electroluminescent lamp, which method comprises, deleting from said finely-divided phosphor substantially all phosphor particles having a diameter less than 8 microns and greater than 25 microns, and incorporating into an electroluminescent lamp only the remainder of said finely divided phosphor.

2. The method of increasing the maintenance of electroluminescent light emission obtainable from finely-divided electroluminescent phosphor at least principally comprising zinc sulfide and having a particle size distribution extending over a considerable range, while preserving a high degree of utility for the phosphor for incorporation into an electroluminescent lamp, which method comprises, deleting from said finely-divided phosphor substantially all phosphor particles having a diameter less than 12 microns and greater than 18 microns, and incorporating into an electroluminescent lamp only the remainder of said finely divided phosphor.

3. The method of increasing the maintenance of electroluminescent light emission obtainable from finely-divided electroluminescent phosphor at least principally comprising zinc sulfide and including copper as activator and having a particle size distribution extending from considerably less than 8 microns to considerably greater than 8 microns, while preserving a high degree of utility for the phosphor for incorporation into an electroluminescent lamp, which method comprises, deleting from said finely-divided phosphor substantially all phosphor particles having a diameter less than 8 microns and greater than 25 microns, and incorporating into an electroluminescent lamp only the remainder of said finely divided phosphor.

4. The method of increasing the maintenance of electroluminescent light emission obtainable from finely-divided electroluminescent phosphor at least principally comprising zinc sulfide and including copper as activator and sufficient coactivator for good electroluminescent response and which phosphor has a particle size distribution extending from considerably less than 8 microns to considerably greater than 8 microns, while preserving a high degree of utility for the phosphor for incorporation into an electroluminescent lamp, which method comprises, deleting from said finely-divided phosphor substantially all phosphor particles having a diameter less than 8 microns and greater than 25 microns, and incorporating into an electroluminescent lamp only the remainder of said finely divided phosphor.

References Cited in the file of this patent

UNITED STATES PATENTS

| | | |
|---|---|---|
| 2,894,854 | MacIntyre | July 14, 1959 |
| 2,911,553 | Joormann | Nov. 31, 1959 |